United States Patent [19]

Woodward

[11] 4,371,132
[45] Feb. 1, 1983

[54] REVERSIBLE THRUST DUCTED FAN PROPULSION UNIT

[75] Inventor: Clifford S. Woodward, Bristol, England

[73] Assignee: Rolls Royce Limited, London, England

[21] Appl. No.: 224,016

[22] Filed: Jan. 12, 1981

[30] Foreign Application Priority Data

Jan. 11, 1980 [GB] United Kingdom .................. 8000615

[51] Int. Cl.³ .............................................. F02K 3/06
[52] U.S. Cl. .............................. 244/53 B; 60/226 A; 60/228; 244/110 B
[58] Field of Search ................ 60/226 A, 226 R, 224, 60/228; 244/110 B, 53 B; 239/265.25, 265.27, 265.31

[56] References Cited

U.S. PATENT DOCUMENTS

| | | | |
|---|---|---|---|
| 3,303,653 | 2/1967 | Hull, Jr. ............................. | 60/226 A |
| 3,494,129 | 2/1970 | Krebs et al. ....................... | 60/226 R |
| 3,820,719 | 6/1974 | Clark ............................ | 60/226 A X |
| 4,005,574 | 2/1977 | Smith, Jr. ......................... | 60/226 A |
| 4,047,911 | 9/1977 | Krojer ............................... | 244/53 B |
| 4,055,042 | 10/1977 | Colley ............................... | 60/226 R |

Primary Examiner—Sherman D. Basinger
Attorney, Agent, or Firm—Stevens, Davis, Miller & Mosher

[57] ABSTRACT

Ducted fan propulsion unit for aircraft has a main duct 3 containing a reversible pitch fan 1 rearward of which is provided a flow splitter 13 dividing the main duct into radially outer and inner branch ducts 3A, 3B. A radial passage 15 in the splitter connects the branch ducts and divides the splitter into front and rear parts 13A, 13B. The part of the inner branch duct forward of the radial passage contains an array of stator vanes 12B and has outer and inner wall surfaces 3B1,3B2 both of progressively reducing diameter to urge the flow through that branch duct toward the inlet of a compressor 8 of yet smaller diameter. Stator vanes 12A in the outer branch duct are arranged forward of the radial passage. The arrangement favors a relatively low axial length of the powerplant.

3 Claims, 2 Drawing Figures

REVERSIBLE THRUST DUCTED FAN PROPULSION UNIT

BACKGROUND OF THE INVENTION

This invention relates to a ducted fan propulsion unit for aircraft and being of the kind wherein the fan is adapted to deliver air rearwards in respect of the aircraft to exert a forward thrust thereon or forwards in respect of the aircraft to exert a braking effect thereon.

British Pat. No. 1,544,826 discloses a ducted fan propulsion unit for aircraft comprising an annular main duct, a fan contained within the main duct and having blades the pitch of which is reversible, a first opening defined in the duct forward of the fan, an annular flow splitter situated rearward of the fan and dividing the main duct into radially outer and inner branch ducts, a passage extending radially through the splitter to connect the branch ducts, outer stator vanes provided in the outer branch duct rearward of said passage, inner stator vanes provided in the inner branch duct forward of said passage, a second opening defined in the outer branch duct rearward of the stator vanes therein, wherein the part of the inner branch duct lying forward of the passage has a cylindrical radially outer surface defined on the splitter and a radially inner surface whose diameter is progressively reducing in the rearward direction, and wherein the part of the inner duct rearward of said passage is defined by outer and inner surfaces both of progressively rearwardly reducing diameter and leading to a compressor of a gas turbine engine for driving the fan.

In one pitch setting of the fan blades, this being the forward thrust setting, air is sucked by the fan through the first opening and passes rearwards into the outer and inner branch ducts. In another pitch setting of the fan blades, this being the reverse thrust setting, the air is sucked by the fan through the second opening into the outer duct and passes from there in part forwards to the first opening and in part through said passage and then rearwards through the part of the inner duct rearward of the passage.

It has been found that in the forward thrust setting there occurs aerodynamic instability of the air passing through the forward part of the inner branch duct. In particular, the air tends to break away from said radially inner surface of said forward part. This is basically due to the fact that said forward part is divergent by reason of its radially outer surface being cylindrical while its inner surface is of rearwardly reducing diameter. Said instability is accentuated by the presence of said stator vanes in said forward part. The problem is particularly acute if one seeks to reduce the overall length of the powerplant because this has the effect, as far as said forward part is concerned, of increasing the rate at which the diameter of said radially inner surface decreases. It is an object of this invention to reduce or overcome that difficulty.

SUMMARY OF THE INVENTION

According to this invention there is provided a ducted fan propulsion unit for aircraft comprising an annular main duct, a fan contained within the main duct and having blades the pitch of which is reversible, a first opening defined in the duct forward of the fan, an annular flow splitter situated rearward of the fan and dividing the main duct into radially outer and inner branch ducts, a passage extending radially through the splitter to connect the branch ducts, outer stator vanes provided in the outer branch duct rearward of said passage, inner stator vanes provided in the inner branch duct forward of said passage, a second opening defined in the outer branch duct rearward of the stator vanes therein, wherein the part of the inner branch duct lying forward of the passage is defined by radially outer and inner surfaces both of progressively rearwardly reducing diameter, and wherein the part of the inner duct rearward of said passage is defined by outer and inner surfaces also both of progressively rearwardly reducing diameter and leading to a compressor of a gas turbine engine for driving the fan.

The progressive rearward reduction of both the outer and the inner surface of said forward part of the inner branch duct forces the air to follow a corresponding rearward and radially inward path, notwithstanding the presence of the guide vanes, and boundary lay separation at the inner surface is at least substantially avoided.

BRIEF DESCRIPTION OF THE DRAWINGS

An example of a ducted fan propulsion unit for aircraft will now be described with reference to the accompanying drawings wherein.

DETAILED DESCRIPTION OF THE INVENTION

Figure 1:
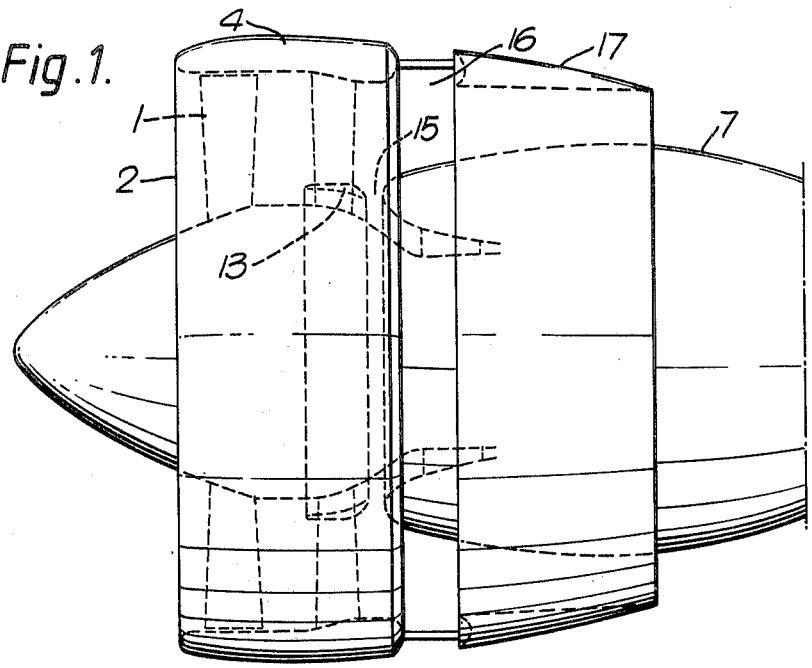
FIG. 1 is a partly sectioned side elevation of the powerplant.
Figure 2:
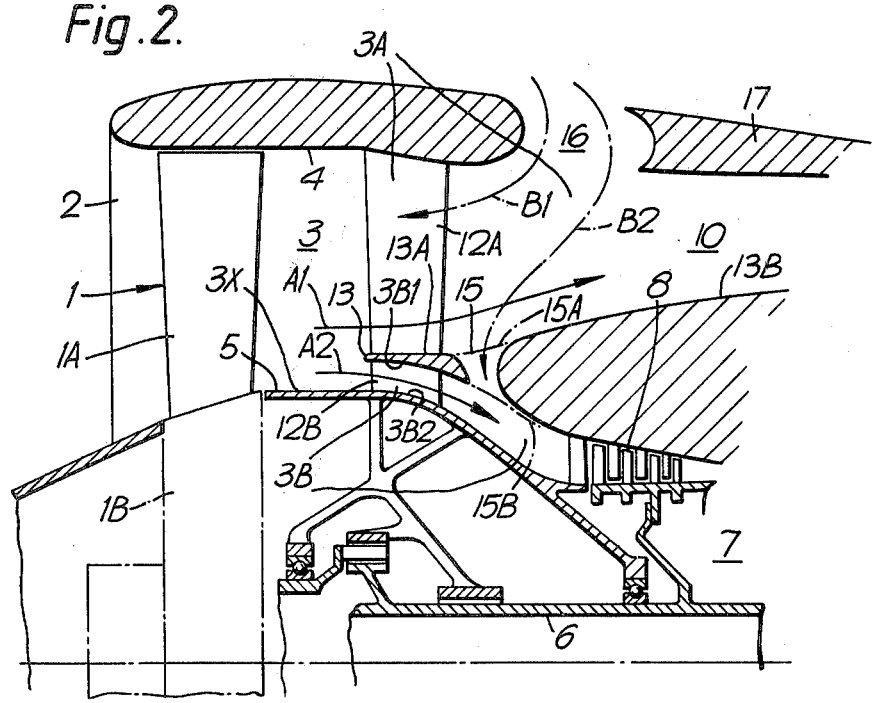
FIG. 2 is an enlarged detail of FIG. 1.

The unit has a main duct 3 defined by an outer wall 4 and an inner wall 5 and containing a fan 1 which has blades 1A whose pitch is reversible by means of a mechanism 1B. Forward of the fan 1 the duct has an inlet/outlet opening 2. In normal forward flight of the aircraft, when a forward thrust is to be applied thereto, the pitch of the fan blades is set to suck air through the opening 2 and pass the air in a rearward direction as indicated by the flows A1,A2. Rearwardly of the fan 1 there is arranged a flow splitter 13 which divides the duct 3 into radially outer and inner branch ducts 3A,3B and which operates to divide rearward flow of air into the flows A1,A2 through the respective ducts 3A,3B. The flow from the fan 1 has a circumferential component or swirl which is taken out by stator vanes 12A,12B so that the flow becomes substantially axial downstream of the latter vanes. The vanes 12A,12B are arranged respectively in the ducts 3A,3B. Rearwardly of the vanes 12A the wall 4 has a part 17 axially movable between open and closed positions. When open, the part 17 reveals an inlet opening 16. The splitter 13 has a forward part 13A and a rearward part 13B, the parts 13A,13B being separated by a radial opening 15 connecting the ducts 3A,3B. When the normal forward flight of the aircraft is to be impeded, the part 17 of the wall 4 is moved rearwards to reveal the opening 16 and the pitch of the fan is reversed so that air is sucked in through the opening 16. As a result there is created a forward flow B1 through the vanes 12A and a flow B2 through the passage 15 into the part of the duct 3B rearwards of the vanes 12B. The flow A1 passes from the duct 3B into a compressor 8 of a gas turbine engine 7 adapted to drive the fan.

In accordance with general requirements of the plant, the duct 3B is of progressively reducing diameter rearwardly toward the compressor 8. The reduction of diameter starts at a position upstream of the vanes 12B so that in the region of those vanes the duct 3B is defined by a curved surface 3B1 itself defined on the splitter 13 and a surface 3B2 defined on the inner wall 5.

The presence of the vanes 12A,12B forward of the passage 15 has the advantage that the flow B2 is not swirled or otherwise impeded by those vanes with corresponding advantages regarding the intake efficiency of the compressor 8. The curved surface 3B1 of the splitter 13 urges the flow A2 into the radially inward direction so that the flow A2 can follow the surface 3B2 without breaking away from that surface.

The splitter 13 comprises a front part 13A and a rear part 13B. Parts 13A,13B are spaced apart axially so as to define the passage 15 therebetween.

The part 13A is so shaped and positioned that the flow A1 crosses the passage 15 at a flow line 15A smoothly, i.e. substantially tangentially connecting the radially outer surface of the parts 13A,13B. Similarly, the flow A2 flows along a flow line 15B smoothly connecting the inner surfaces of the parts 13A,13B.

I claim:

1. A ducted fan propulsion unit for aircraft comprising an annular main duct, a fan contained within the main duct and having blades the pitch of which is reversible, a first opening defined in the duct forward of the fan, an annular flow splitter situated rearward of the fan and dividing the main duct into radially outer and inner branch ducts, a passage extending radially through the splitter to connect the branch ducts, outer stator vanes provided in the outer branch duct forward of said passage, inner stator vanes provided in the inner branch duct forward of said passage, a second opening defined in the outer branch duct rearward of the stator vanes therein, wherein the part of the inner branch duct lying forward of the passage is defined by radially outer and inner surfaces configured so there is a progressively rearwardly reducing diameter of said inner duct, and wherein the part of the inner duct rearward of said passage is defined by outer and inner surfaces configured so there is a progressively rearwardly reducing diameter and leading to a compressor of a gas turbine engine for driving the fan, said radially outer surface of said inner duct forward of said passage being shaped so as to urge the air flow in said inner duct in a radially inward direction.

2. Unit according to claim 1 wherein the splitter comprises a front and a rear part spaced apart axially so as to define said passage therebetween, and wherein said front part is so positioned and shaped in relation to the rear part that air flowing rearwards over the splitter crosses the passage along a flow line smoothly connecting the radially outer surfaces of the splitter parts and along a flow line smoothly connecting the radially inner surfaces of the splitter parts.

3. A unit according to claim 1 or 2, wherein said second opening and said passage are substantially in radial alignment so that the air flowing through the second opening and toward the passage may have a significant radial component.

* * * * *